United States Patent [19]

Shigihara

[11] Patent Number: 5,537,153
[45] Date of Patent: Jul. 16, 1996

[54] TELEVISION SIGNAL TRANSMISSION AND RECEPTION SYSTEM WITH MULTI-SCREEN DISPLAY FOR TUNING OPERATION

[75] Inventor: Hideo Shigihara, Saitama-ken, Japan

[73] Assignee: Kabushiki Kaisha Toshiba, Kawasaki, Japan

[21] Appl. No.: 145,217

[22] Filed: Nov. 3, 1993

[30] Foreign Application Priority Data

Nov. 16, 1992 [JP] Japan .................................. 4-305532
Jun. 8, 1993 [JP] Japan .................................. 5-137377

[51] Int. Cl.⁶ .................................................. H04N 7/173
[52] U.S. Cl. ........................................ 348/564; 348/723
[58] Field of Search .................................. 348/564, 723, 348/724, 7, 385, 159, 153, 584, 569; H04N 7/18, 7/173

[56] References Cited

U.S. PATENT DOCUMENTS 3,825,674  7/1974  Justice .................................. 348/7
4,061,577 12/1977  Bell ...................................... 348/723
4,814,869  3/1989  Oliver, Jr. ............................ 348/159
4,977,449 12/1990  Morgan ................................ 348/159
5,258,837 11/1993  Gormley .............................. 348/153

*Primary Examiner*—Victor R. Kostak
*Attorney, Agent, or Firm*—Banner & Allegretti, Ltd.

[57] ABSTRACT

Television signal transmission and reception system includes a broadcasting center, a transmission network and many reception terminals. In the broadcasting center, plural television signals corresponding to individual channels are modulated into transmittable form, and a synthesis circuit synthesizes the television signals to produce a synthesis image signal for a multi-screen display comprising plural small screens. Both the ordinary television signal and the synthesis image signal is transmitted with control information to the reception terminals through the transmission network. In the reception terminal, for selecting a desired channel out of the individual channels, the synthesis image signal is used for displaying a multi-screen, a moveable cursor image is superimposed on the multi-screen for designating one small screen corresponding to the desired channel. The channel designated by the cursor image is detected based on the control information, and the television signal of the designated channel is demodulated.

9 Claims, 9 Drawing Sheets

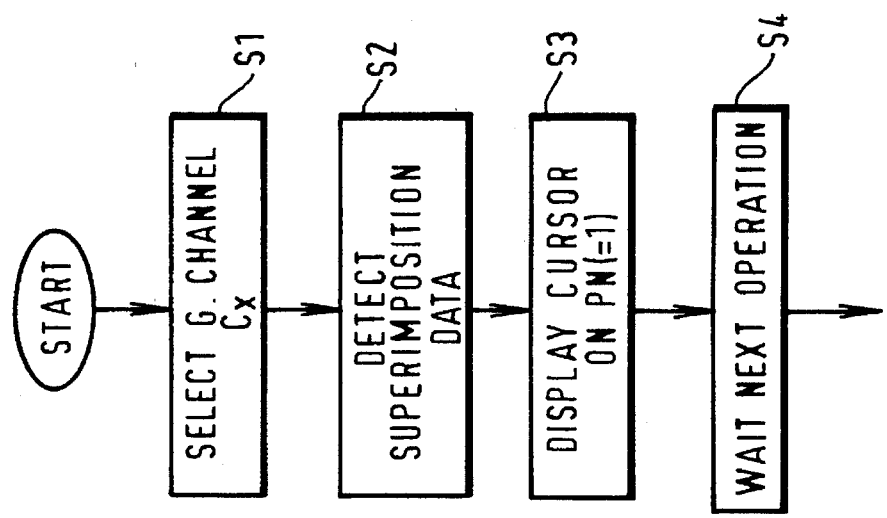
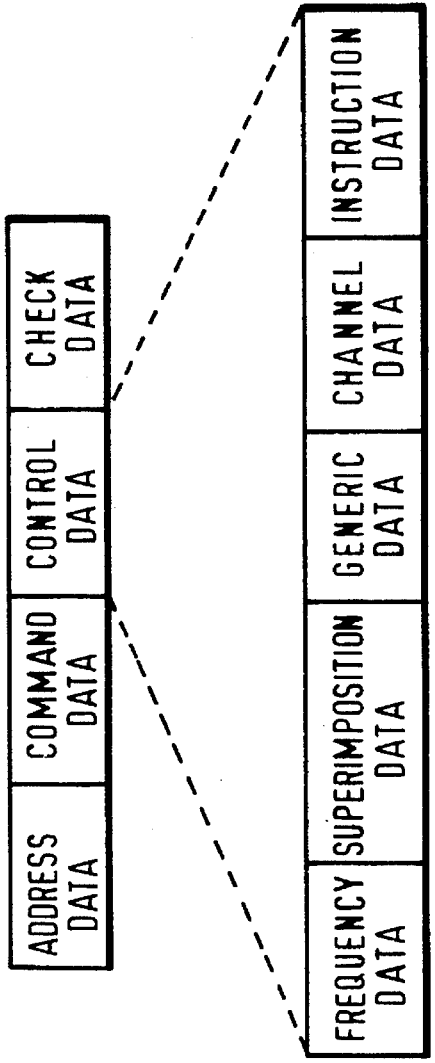

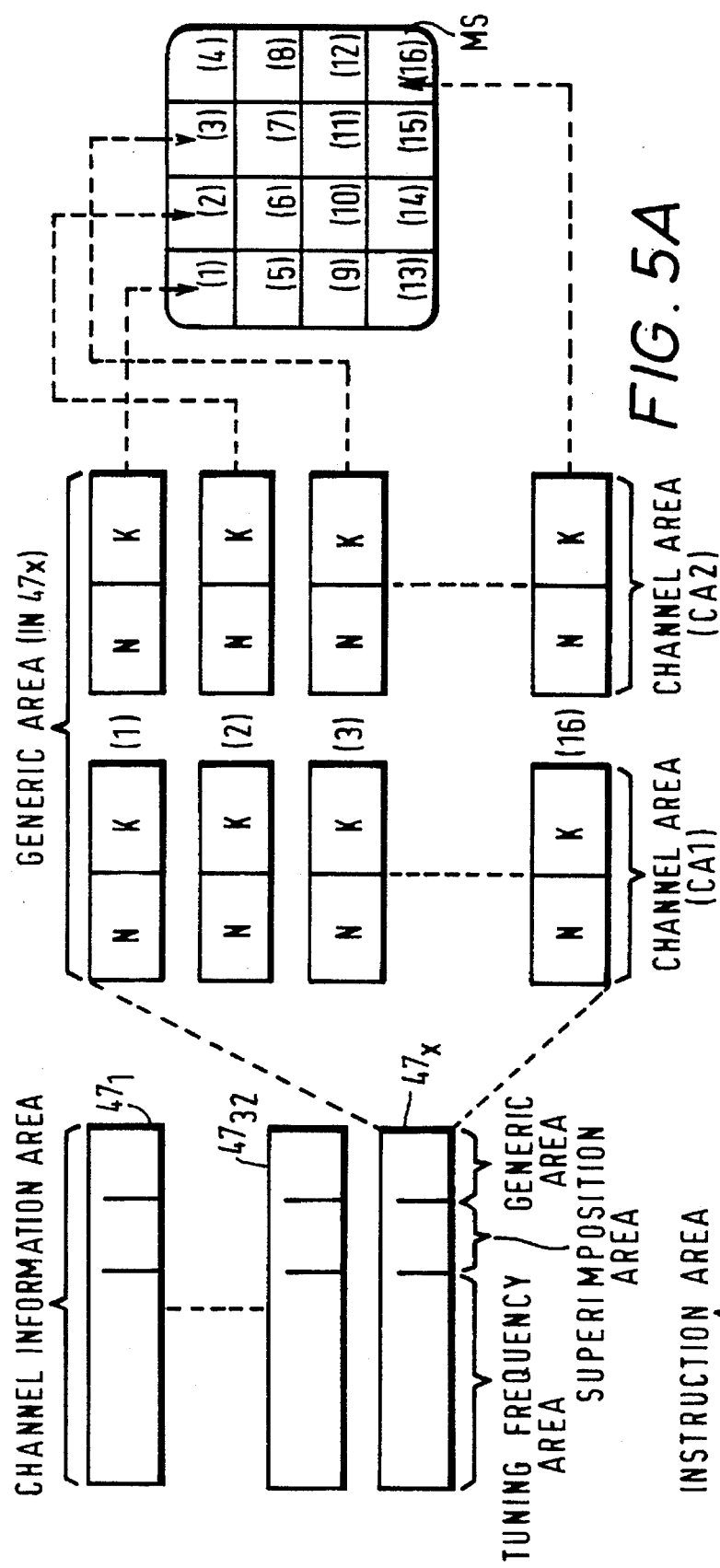

TELEVISION SIGNAL TRANSMISSION AND RECEPTION SYSTEM WITH MULTI-SCREEN DISPLAY FOR TUNING OPERATION

FIELD OF THE INVENTION

The present invention generally relates to the television signal transmission and reception field, and more particularly, is directed to a tuning system which is capable of selecting a desired program out of a multi-channel broadcast, for instance a CATV (Cable Television) broadcast. The tuning system employs multi-screen displaying in which a plurality of programs on different channels are simultaneously displayed on one screen.

BACKGROUND OF THE INVENTION

In the CATV broadcasting system, which is the system presently and widely in use in the United States and in many other countries, television signals are transmitted by multiple cables from the broadcasting center, which is the program supplier, to subscribers' reception terminals which are installed at the program viewer's site. In this system, a program viewer looks for and selects a desired program out of a large number of programs supplied from the broadcasting center, in general, by successively tuning in the channels one by one at the subscriber's reception terminal. For this reason, the greater number of the program channels, the more complex and troublesome the handling of the tuning operation becomes.

Recently, a multi-screen display has been used which is formed by dividing the screen of the television set cooperating with the reception terminal into a plurality of sub-screens on which the programs of different channels are respectively and simultaneously displayed. Such a multi-screen display has been tried in order to make the tuning operation easy. However, in the conventional system, the image for the multi-screen display is formed by the reception terminal at the subscriber side by means of editing the images of a plurality of television signals. Therefore, the reception terminal is required to use a memory with a large capacity so as to store all the images of the television signals corresponding to the programs involved in the multi-screen display. As a result, in the case where the multi-screen display is employed in the conventional system, the reception terminal suffers the disadvantage of being complex in construction and high in cost, so that it is unsuitable for practical use.

Moreover, in the television system known in the prior art, when forming the above multi-screen display on the television set, no audio signals of the programs are produced on the multi-screen display. Therefore, it is impossible to select a desired program by listening to the audio of the programs in cooperation with the multi-screen display.

SUMMARY OF THE INVENTION

In accordance with this invention, a system is provided for transmitting television signals corresponding to a plurality of channels from a program supplier side and for receiving the television signals at a program reception side. At the program supplier side, the system produces a synthesis television signal corresponding to a guide channel by synthesizing the television signals in order to provide a multi-screen display comprising a plurality of sub-screens which correspond to the channels one by one, and it transmits the synthesis television signal together with the ordinary television signals. In addition, in the program reception side, the system includes a reception apparatus for selectively tuning in one of the channels including the guide channel and for processing the television signal of the tuned channel. When in the guide channel, the reception apparatus provides a selecting operation by which one of the channels corresponding to the small screens is selected. For instance, the reception apparatus superimposes a cursor image on the multi-screen for designating one of the sub-screens according to an external operation by a program viewer.

It is therefore an object of the present invention to provide a television signal transmission and reception system by which program viewers can easily look for and select a desired program.

Another object of the present invention is to provide a television signal transmission system which can transmit a lot of useful information for selecting a desired program.

A further object of the present invention is to provide a television signal reception system which has various functions for making a tuning operation easy and is suitable in practical use.

The above and other objects of the present invention will become obvious upon an understanding of the illustrative embodiments described below. Various advantages which are not referred to herein will also occur to those skilled in the art upon employment of the present invention in practice.

BRIEF DESCRIPTION OF THE DRAWINGS

FIG. 4 is a diagram showing the contents of control information produced by the broadcasting center.

FIGS. 5A and 5B are diagrams showing memory maps for storing control data of the control information at the reception terminal.

FIGS. 7, 8 and 9 are flow-charts for executing a program selecting operation.

DETAILED DESCRIPTION OF THE PREFERRED EMBODIMENT

Representative embodiments of the present invention will now be explained with reference to the accompanying drawings.

Figure 1:
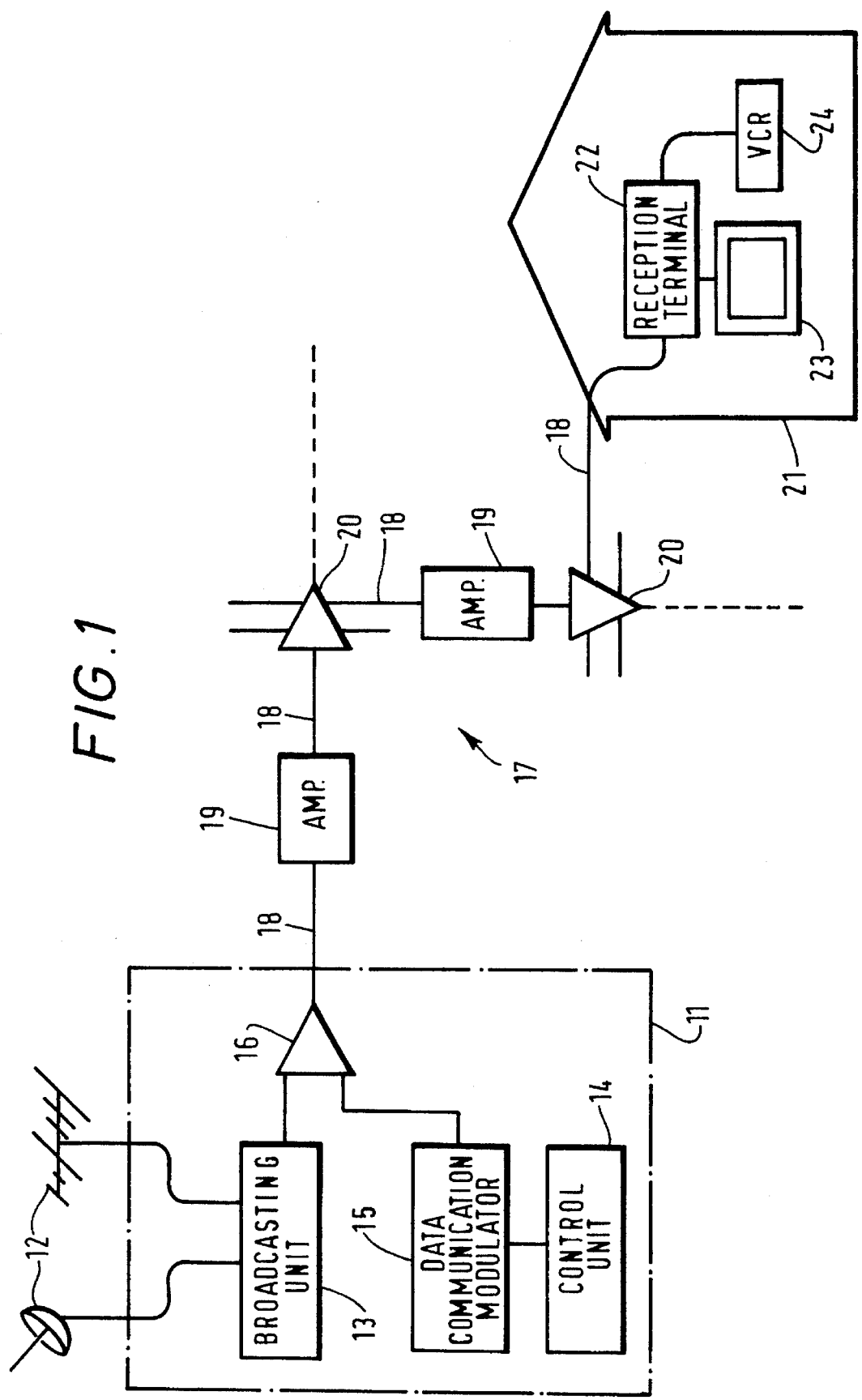
FIG. 1 is a schematic block diagram illustrating a television signal transmission and reception system in accordance with an embodiment of the present invention.

FIG. 1 is a schematic block diagram illustrating a television signal transmission and reception system in accordance with an embodiment of the present invention, which is applied to a CATV broadcasting system.

In FIG. 1, a broadcasting center 11, which is the program supplier of the CATV broadcasting system, receives various program information via antennas 12 for satellite broadcasts and ground wave broadcasts. In broadcasting center 11, broadcasting unit 13 demodulates the received program information, and modulates this information into television signals with the format in accordance with the CATV broadcasting system. At the same time, control unit 14 produces the control information to be added to the television signals supplied by broadcasting unit 13. The control information is modulated by data communication modulator 15 into an appropriate form to mix with the television signals. Mixer circuit 16 positioned at the output stage in broadcasting center 11 mixes both output signals of broadcasting unit 13 and data communication modulator 15, and transmits the television signal with the programs and the control information to cable broadcast transmission network 17.

Transmission network 17 is constructed by the arrangement of a plurality of transmission route amplifiers 19 and branching circuits 20 at various positions on cables 18 which transmit the television signals. Transmission route amplifiers 19 compensate for signal losses caused by transmission on cable 18. In addition, branching circuits 20 branch the television signals to a plurality of cables 18 so that the end of each cable is connected to a reception terminal 22 installed in subscriber's house 21. In subscriber's house 21, reception terminal 22 is connected to television set 23 in order to display the program of the television signal demodulated thereby, and may be connected to VCR. (video cassette recorder) 24 in order to record such program.

Figure 2:
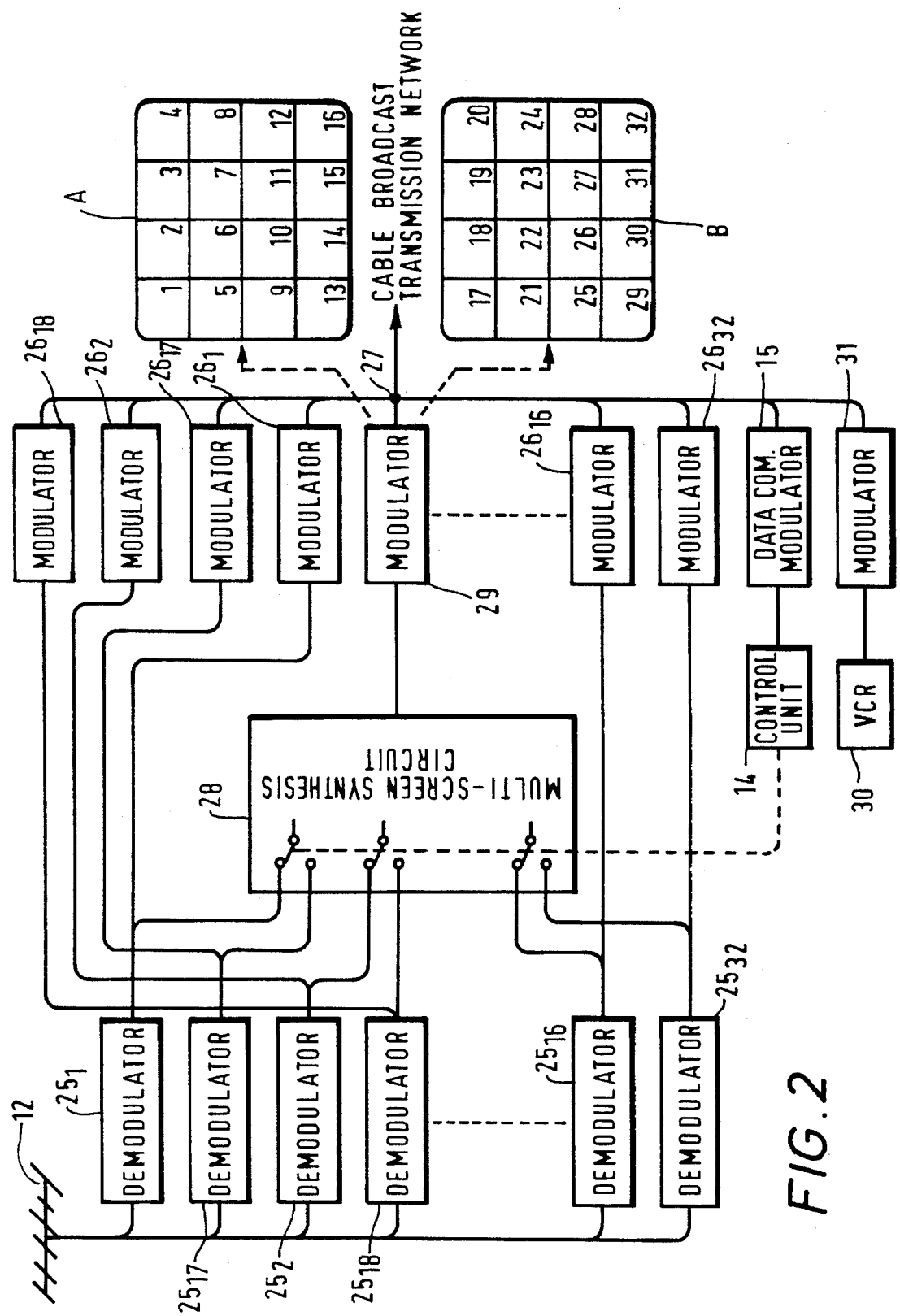
FIG. 2 is a block diagram illustrating a circuitry of the broadcasting center in FIG. 1.

FIG. 2 is a block diagram illustrating the circuitry of broadcasting center 11 in FIG. 1. As shown in FIG. 2, the various program information received by antenna 12 is respectively supplied to thirty-two demodulators $25_1$ to $25_{16}$ and $25_{17}$ to $25_{32}$. In other words, the program information for a maximum of thirty-two different programs is respectively demodulated and converted to video signals having image signals and audio signals. In this case, the video signals produced by demodulators $25_1$ to $25_{16}$ and $25_{17}$ to $25_{32}$ correspond respectively to channels $C_1$ to $C_{16}$ and $C_{17}$ to $C_{32}$, and are supplied to respective modulators $26_1$ to $26_{16}$ and $26_{17}$ to $26_{32}$. The modulators modulate the video signals to television signals with a format in accordance with the CATV broadcasting system to be transmittable by cable broadcast transmission network 17. In addition, these television signals are mixed with the control information supplied by data communication modulator 15 at cross point 27 at which mixer circuit 16 shown in FIG. 1 is positioned, and are transmitted to network 17.

At the same time, each image signal of the video signals produced by demodulators $25_1$ to $25_{16}$ and $25_{17}$ to $25_{32}$ are respectively supplied to input terminals of multi-screen synthesis circuit 28 which has the function of producing a synthesis image signal for multi-screen display. Multi-screen synthesis circuit 28 produces two types of synthesis image signals. One signal is synthesized from the sixteen image signals of channels $C_1$ to $C_{16}$ supplied by demodulators $25_1$ to $25_{16}$, and the other signal is synthesized from the sixteen image signals of channels $C_{17}$ to $C_{32}$ supplied by demodulators $25_{17}$ to $25_{32}$. These two synthesis image signals are periodically switched under the control of control unit 14, and are selectively supplied to modulator 29. The synthesis image signal supplied to modulator 29 is modulated to the form of a television signal, and mixed with the control information supplied by data communication modulator 15 and the other television signals supplied by modulators $26_1$ to $26_{16}$ and $26_{17}$ to $26_{32}$ at cross point 27. Note that the synthesis image signals for the multi-screen display will now be defined as guide channel $C_X$.

In the case where the CATV broadcasting system is a type of the two way system capable of transmitting information or an instruction from reception terminal 22 of the subscriber side to broadcasting center 11 of the program supplier side, control unit 14 may switch the two synthesis image signals at the request of the subscriber.

By the above process, when the television signal of guide channel $C_X$ is demodulated at reception terminal 22 in subscriber's house 21, the multi-screen images synthesized from the images of the television signals corresponding to channels $C_1$ to $C_{16}$ and channels $C_{17}$ to $C_{32}$ are displayed by television set 23 as shown by screens A and B in FIG. 2, respectively. As is apparent from screens A and B, each multi-screen image is formed by dividing one screen into sixteen small screens on which the programs of the respective sixteen channels are simultaneously displayed. In this case, each image on the sixteen sub-screens into which both screens A and B are divided is not a still picture, but a live picture.

In addition, broadcasting unit 13 includes VCR 30, as shown in FIG. 2, which is capable of recording and reproducing video signals of a message program to notify subscribers. Such message program which will now be defined as notification channel $C_K$ and comprises, for instance, advertisements of channels for which the subscriber has not yet contracted to receive from the program supplier, and the notices that the subscriber has failed to pay the charges for channels contracted to be received from the program supplier. The video signal of the message program reproduced by VCR 30 is supplied to modulator 31 for modulating to the form of television signal according to the CATV broadcasting system. This television signal is mixed with the control information supplied by data communication modulator 15 and the other television signals supplied by modulators $26_1$ to $26_{16}$, $26_{17}$ to $26_{32}$ and 29 at cross point 27, and is transmitted to network 17.

As described above, broadcasting center 11 produces the programs of the thirty-four channels which include thirty-two normal channels $C_1$ to $C_{16}$ and $C_{17}$ to $C_{32}$, guide channel $C_X$ and notification channel $C_K$. In the case where the program viewer selects guide channel $C_X$, reception terminal 22, which will be discussed in detail below, superimposes a cursor on the multi-screen so that a desired program can be selected by moving the cursor onto the sub-screen thereof. For this reason, the operation of tuning in the desired program can be easily executed by the steps of selecting one of screen A and B and designating the sub-screen of the desired program by the cursor.

In addition, in the multi-screen display of this embodiment, it is possible to freely arrange the position of each image of the sixteen programs by controlling the synthesizing operation of multi-screen synthesis circuit 28 so that an image of a particular channel can be positioned on any sub-screen. Therefore, the arrangement of the images of the sixteen programs corresponding to either group of channels $C_1$ to $C_{16}$ and $C_{17}$ to $C_{32}$ is not limited to that as shown in screens A and B in FIG. 2.

Moreover, reception terminal 22 described in this embodiment has the following function. When the program viewer selects, for instance, a channel not yet contracted to receive or a channel not yet paid for, reception terminal 22 tunes in notification channel $C_K$ without regard to the selected channel in order to provide the program viewer with the recommendation of the contract or the notice of the payment for the reception charge.

Figure 3:
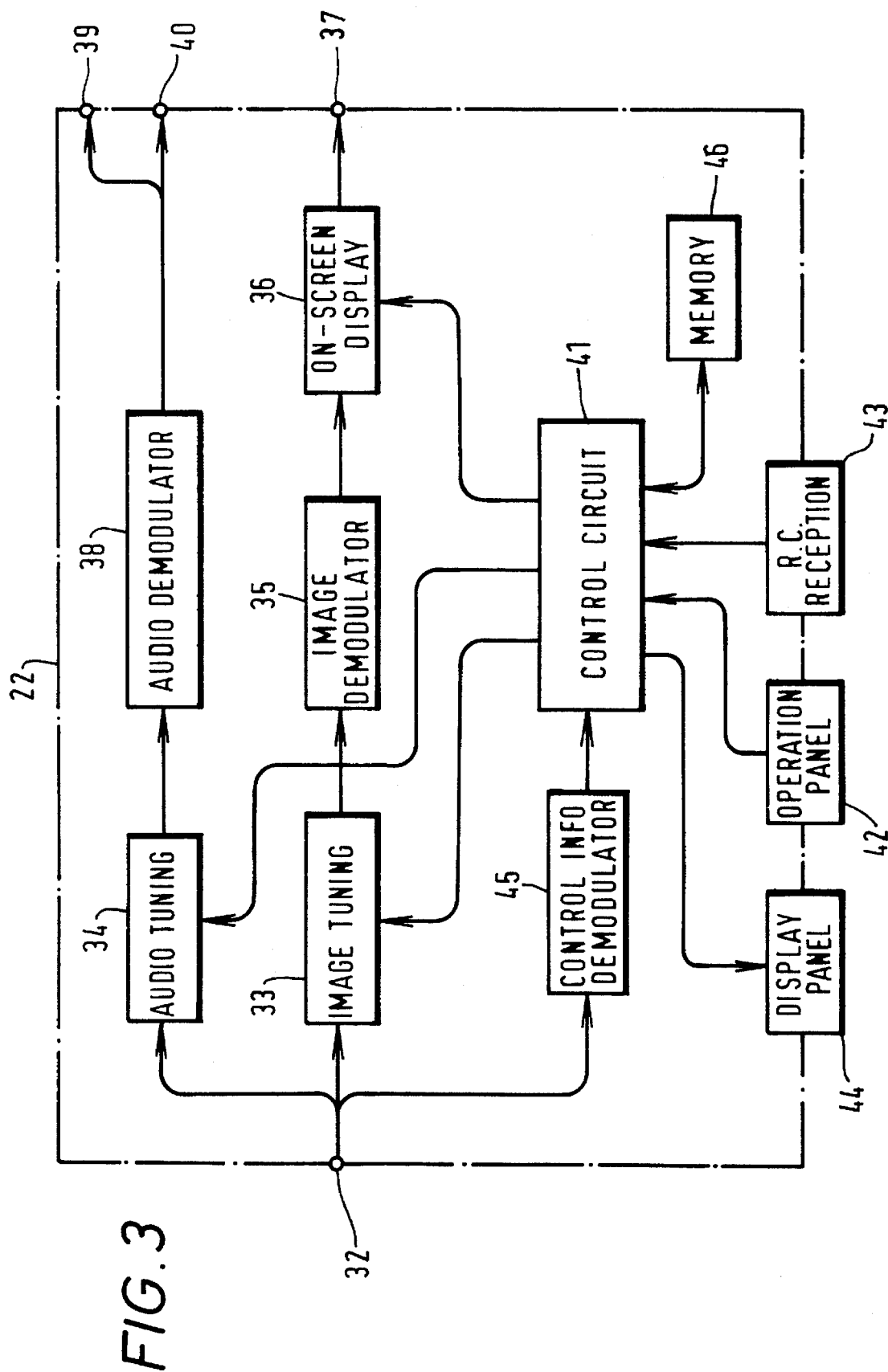
FIG. 3 is a block diagram illustrating a circuitry of the reception terminal in FIG. 1.

FIG. 3 is a block diagram illustrating the circuitry of reception terminal 22 in FIG. 1. In reception terminal 22, the television signals of the thirty-four channels transmitted via cable broadcast transmission network 17 are supplied to image tuning circuit 33 and audio tuning circuit 34 through input terminal 32. The television signal of the channel selected by the program viewer is tuned by image tuning circuit 33, so that the image signal of that television signal is supplied to image demodulator 35. The image signal demodulated by image demodulator 35 is supplied to on-screen display circuit 36 in order to superimpose the cursor mentioned above on the screen of television set 23 in FIG. 1 when the program viewer selects guide channel $C_X$. In this way, the image signal is provided to television set 23 from on-screen display circuit 36 through output terminal 37. At the same time, the audio signal corresponding to the channel selected by the program viewer is tuned by audio tuning circuit 34, and is supplied to audio demodulator 38. Since the audio signal demodulated by audio demodulator 38 comprises an R (right) channel component and an L (left) channel component, both the R and L channel components are respectively and separately supplied to output terminal 39 and 40, and are provided for audio reproduction of speakers (not shown) built in television set 23.

In addition, the control information which is supplied to input terminal 32 in the mixed state with the television signal is supplied to and demodulated by control information demodulator 45. The demodulated control information is supplied to control circuit 41 which has a micro-computer. In this case, control circuit 41 write the contents of control information by the channel to memory 46. Also, control circuit 41 controls the operations of image tuning circuit 33 and audio tuning circuit 34 in accordance with the requirements of the program viewer which are provided by operating the keys on operation panel 42 or a remote control unit (not shown). The control signals emitted by the remote control unit are supplied to control circuit 41 via remote control reception unit 43. Moreover, control circuit 41 drives display panel 44 having a liquid crystal device or the like in order to indicate the instructions for operating and the operational state of reception terminal 22.

In the case where the program viewer selects guide channel $C_X$ by operating operation panel 42 or the remote control unit, reception terminal of FIG. 3 operates in the following manner. Control circuit 41 supplies image tuning circuit 33 with the instruction signal to tune in guide channel $C_X$. Therefore, the synthesis image signal for the multi-screen display is supplied to image demodulator 35 by image tuning circuit 33, and is demodulated. The demodulated synthesis image signal is added with an image signal indicating the cursor thereon by on-screen display circuit 36, in this state, and is supplied to television set 23 via output terminal 37. In this case, control circuit 41 supplies audio tuning circuit 34 with the instruction signal to tune in the channel of which one of sixteen sub-screens is designated by the cursor. By this process, the audio signal of the program designated by the cursor is demodulated by audio demodulator 38, and is supplied to television set 23 via output terminals 39 and 40.

In addition to the above operation, when the program viewer has an operation to move the cursor onto another sub-screen, control circuit 41 supplies on-screen display circuit 36 with the instruction signal to change the display position of the cursor, and also supplies audio tuning circuit 34 with the instruction signal to change the tuning channel to the channel of which the sub-screen is newly designated by the cursor. In this way, the audio signal which is to be supplied to television set 23 is selected in accordance with the designation of the cursor.

FIG. 4 is a diagram showing the contents of the control information produced by control unit 14 in broadcasting center 11 of FIG. 2. The control information includes address data, command data, control data and check data. These data are used for the operations in reception terminal 22 as the following. The address data is used for designating the individual ID (identify code) allocated to reception terminal 22. The command data is used for designating the area in memory 46 to which the control data is written. The check data is used for the error detecting and correcting operation of the address, command and control data. The control data, which is written in memory 46, includes: frequency data which indicates the tuning frequencies of each channel; superimposition data indicates whether or not the cursor is superimposed on the images of each channel; generic data which indicates whether the images of each channel are allocated to screen A or B; channel data which indicates what channels are positioned to be displayed on each sub-screen of the multi-screen display; and instruction data which indicates whether or not notification channel $C_K$ will be provided instead of the channel selected by the program viewer. Note that the channel data may have any form, individual numbers and the tuning frequencies of each channel for instance, on condition that it identifies each channel.

FIGS. 5A and 5B are diagrams showing memory maps for storing the control data in memory 46 in FIG. 3. As shown in FIG. 5A, in memory 46 of reception terminal 22, thirty-three channel information areas $47_1$ to $47_{32}$ and $47_X$, which correspond respectively to channels $C_1$ to $C_{32}$ and guide channel $C_X$, are provided for storing all control data except the instruction data by the channel. For this reason, each of channel information areas $47_1$ to $47_{32}$ and $47_X$ is divided by a tuning frequency area for storing the tuning frequency data, a superimposition area for storing the superimposition data and a generic area for storing the generic data. In addition, the generic area of channel information area $47_X$ corresponding to guide channel $C_X$ is divided by a pair of channel areas CA1 and CA2 which have respectively sixteen areas for storing the channel data. In this case, respective screen position numbers (1) to (16) are allocated to each of the sixteen sub-screens of multi-screen MS. Therefore, the channel data is stored in the sixteen areas corresponding to each of screen position numbers (1) to (16). Note that channel areas CA1 and CA2 correspond to screen A and B, respectively. Moreover, each of channel areas CA1 and CA2 is divided by a pair of areas N and K. In areas N, the channel data corresponding to channels $C_1$ to $C_{32}$ are stored in accordance with screen position numbers (1) to (16). However, in areas K, the channel data of notification channel $C_K$ are stored in relation to respective channels $C_1$ to $C_{32}$.

In addition, as shown in FIG. 5B, instruction areas $48_1$ to $48_{16}$ corresponding to screen position numbers (1) to (16) are provided for storing the instruction data in memory 46. This instruction data instructs whether the channel data stored in areas N or K is selected and is supplied for the tuning operation.

For example, suppose that the channel data '3' indicating channel $C_3$ is stored in the area N of channel area CA1 corresponding to screen position numbers (1), and the channel data of notification channel $C_K$ having the notice of payment for the reception contract charge is stored in the area K of channel area CA1 corresponding to screen position numbers (1). In this case, if the instruction data which instructs to select the channel data of area N is stored in instruction area $48_1$ corresponding to screen position numbers (1), control circuit 41 in FIG. 3 supplies both image tuning circuit 33 and audio tuning circuit 34 with the instruction signals to tune in channel $C_3$ when the program of screen position numbers (1) in screen A is selected by the program viewer. However, if the instruction data which instructs to select the channel data of area K is stored in instruction area $48_1$, control circuit 41 controls to tune in notification channel $C_K$ instead of channel $C_3$.

Note that the instruction data is made by broadcasting center 11 so as to suit each subscriber according to the individual ID allocated to reception terminal 22. In accordance with the above example, broadcasting center 11 provides the instruction data to select channel $C_3$ for the subscribers who finally pay the reception contract charge for channel $C_3$, while broadcasting center 11 provides the instruction data to select notification channel $C_K$ for the subscribers who fail to pay the reception contract charge for channel $C_3$.

In other words, the control information having the contents described above and corresponding to all channels C1 to C32 and CX is constantly supplied by control unit 14 of broadcasting center 11, and is constantly stored in memory 46 of reception terminal 22.

Figure 6B:
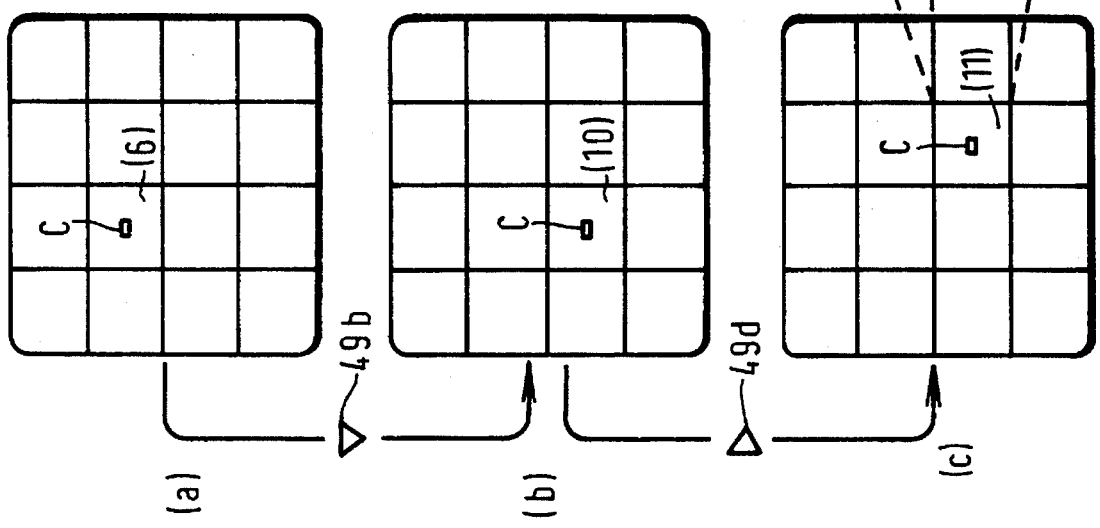
FIGS. 6A and 6B are diagrams showing respectively a unit of operation keys for selecting a program out of a multi-screen and a series of multi-screens on which a cursor images is shifted in accordance with operations by those keys.
Figure 6A:
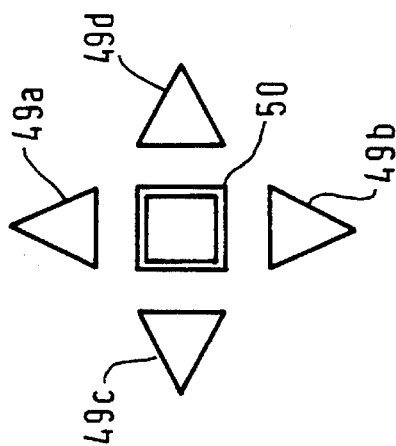

With reference to FIGS. 6A and 6B which are diagrams showing respectively a unit of operation keys for selecting a program and a series of multi-screens with cursor images, a program selecting operation of this embodiment will now be explained.

As shown in FIG. 6A, the operation keys comprise four direction designation keys 49a, 49b, 49c and 49d which are used for designating vertical and horizontal directions to shift the cursor image on a multi-screen and decision key 50 which is surrounded by these direction designation keys. These operation keys are provided on both operation panel 42 in FIG. 3 and the remote control unit. For example, suppose that the program viewer selects guide channel $C_X$. In this case, a multi-screen simultaneously showing the programs of sixteen different channels $C_1$ to $C_{16}$ or $C_{17}$ to $C_{32}$ is displayed on the screen of television set 23. In this state, supposing that the cursor image C is superimposed on the sub-screen of screen position number (6) as shown in FIG. 6B(a), if downward direction designation key 49b is operated, the cursor image C will shift one sub-screen downward and be positioned on the sub-screen of position number (10) as shown in FIG. 6B(b). After this operation, if right-ward direction designation key 49d is operated, the cursor image C will shift one sub-screen right-ward and be positioned on the sub-screen of position number (11) as shown in FIG. 6B(c). Then, according to the operation of decision key 50 in this state, the program of the channel corresponding to screen position number (11) is displayed on the whole screen of television set 23.

In this way, the cursor image can be shifted onto the desired sub-screen of screen position numbers (1) to (16) by selectively operating four direction designation keys 49a, 49b, 49c and 49d. As the following operation, by operating decision key 50, the desired channel designated by the cursor image is selected to tune in.

Figure 8:
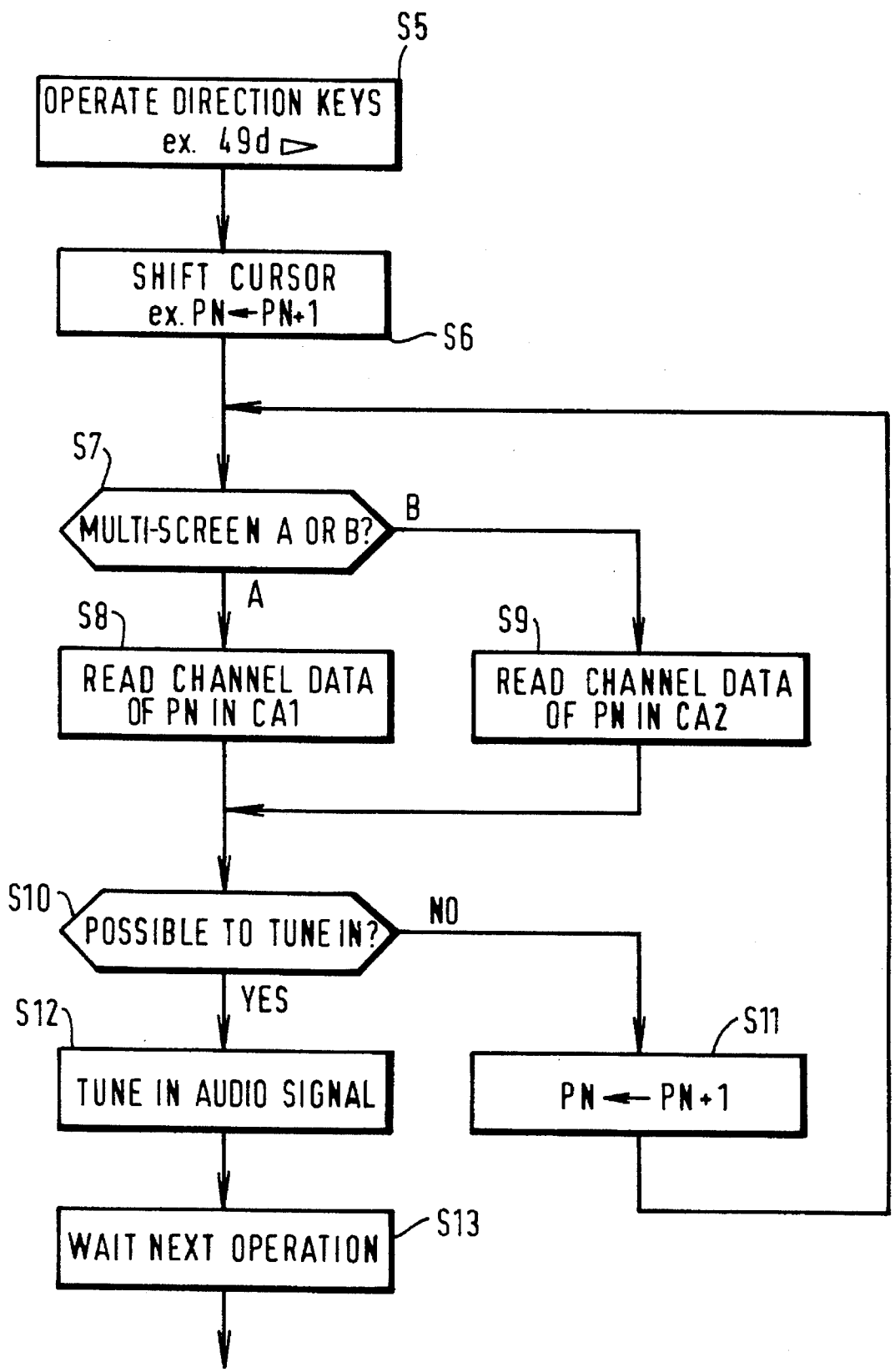
Figure 9:
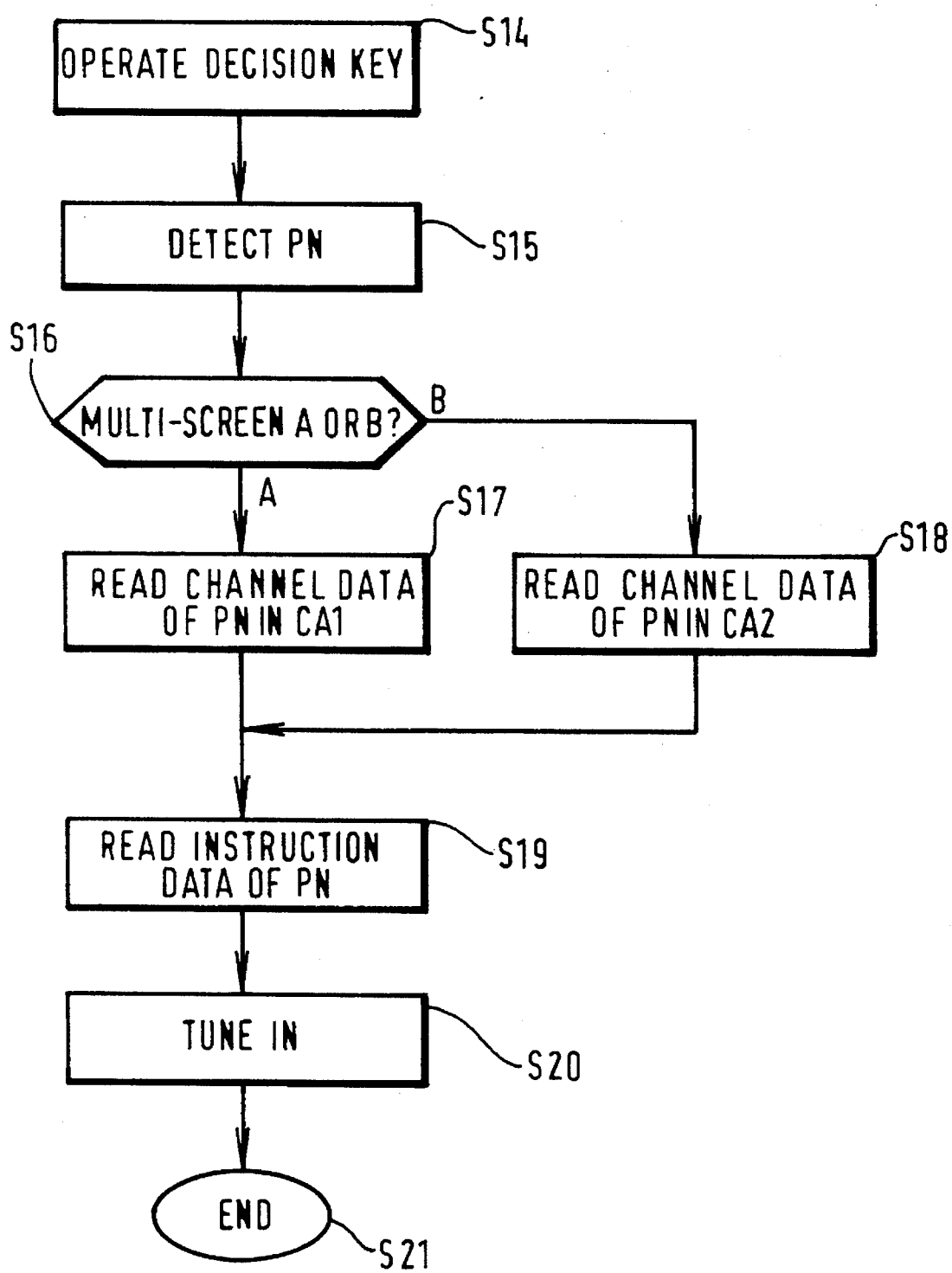

FIGS. 7, 8 and 9 are flow-charts for executing the above program selecting operation. In the flow-chart of FIG. 7, following the selection of guide channel $C_X$ by program viewer in step S1, control circuit 41 in FIG. 3 reads out the superimposition data from channel information area $47_X$ corresponding to guide channel $C_X$ in memory 46, in step S2, and detects a requirement for the superimposition of the cursor image on the multi-screen. In step S3, control circuit 41 controls on-screen display circuit 36 so that the cursor image is superimposed on the sub-screen of position number (1). (PN in FIGS. 7 to 9 expresses a screen position number.) Then, a waiting state for the next operation comes in step S4.

In the next step S5 in the flow-chart of FIG. 8, direction designation keys 49a, 49b, 49c and 49d are selectively operated to shift the cursor image. Therefore, in step S6, control circuit 41 controls on-screen display circuit 36 according to the operation of step S5 and detects the new screen position number PN of the sub-screen onto which the cursor image is shifted. For instance, if right-ward direction designation key 49d is operated once, the new screen position number PN is set equal to PN+1. In this state, control circuit 41 detects in accordance with the generic data corresponding to guide channel $C_X$ whether multi-screen A or B is displayed at this time in step S7. As a result, when displaying multi-screen A, in step S8, control circuit 41 reads out the channel data corresponding to screen position number PN from channel area CA1 in memory 46. However, when displaying multi-screen B, the channel data corresponding to screen position number PN is read out from channel area CA2 in step S9. Then, in step S10, control circuit 41 reads out the frequency data from the tuning frequency area in memory 46 corresponding to the channel data read out in the previous step S8 or S9, and discriminates whether it is possible to tune in this frequency. As a result, if it is possible, in step S12, control circuit 41 controls audio tuning circuit 34 so as to tune in the channel corresponding to screen position number PN of the screen on which the cursor image is superimposed. However, if it is not tunable, control circuit 41 makes screen position number PN set equal to PN+1 in step S11, namely, the cursor image is shifted to the next sub-screen without regard to the operation by the program viewer, and the next step returns to step S7. In other words, after step S12, a waiting state for the next operation comes again in step S13.

In this state, as shown in FIG. 9, suppose that decision key 50 is operated in step S14. According to this operation, control circuit 41 confirms screen position number PN of the screen on which the cursor image is superimposed in step S16. Then, control circuit 41 detects whether multi-screen A or B is displayed at this time in step S16. As a result, when displaying multi-screen A, in step S17, control circuit 41 reads out the channel data corresponding to screen position number PN from channel area CA1 in memory 46. However, when displaying multi-screen B, the channel data corresponding to screen position number PN is read out from channel area CA2 in step S18. In addition, control circuit 41 checks the instruction data stored in the instruction area in FIG. 5B corresponding to screen position number PN, which indicates whether or not a selection of the channel data of notification channel $C_K$ is required, in step S19. Therefore, in step S20, control circuit 41 executes the tuning operation in accordance with the channel data read out in step S17 or S18 and the instruction data read out in step S19.

In accordance with this embodiment, since the synthesis image signal for the multi-screen display is produced by the broadcasting center at the program supplier side, the reception terminal at the subscriber side can avoid using a large capacity memory for synthesizing the images of a plurality of television signals. In addition, a desired program can be selected by moving the cursor superimposed on the multi-screen display. Therefore, the tuning operation of the program viewer can be easily executed even if there are many channels. Moreover, since the audio signal corresponding to the channel designated by the cursor is demodulated and is supplied to the television set, the program viewer can select a desired program by listening to the audio of that program in cooperation with the multi-screen display.

Figure 10:
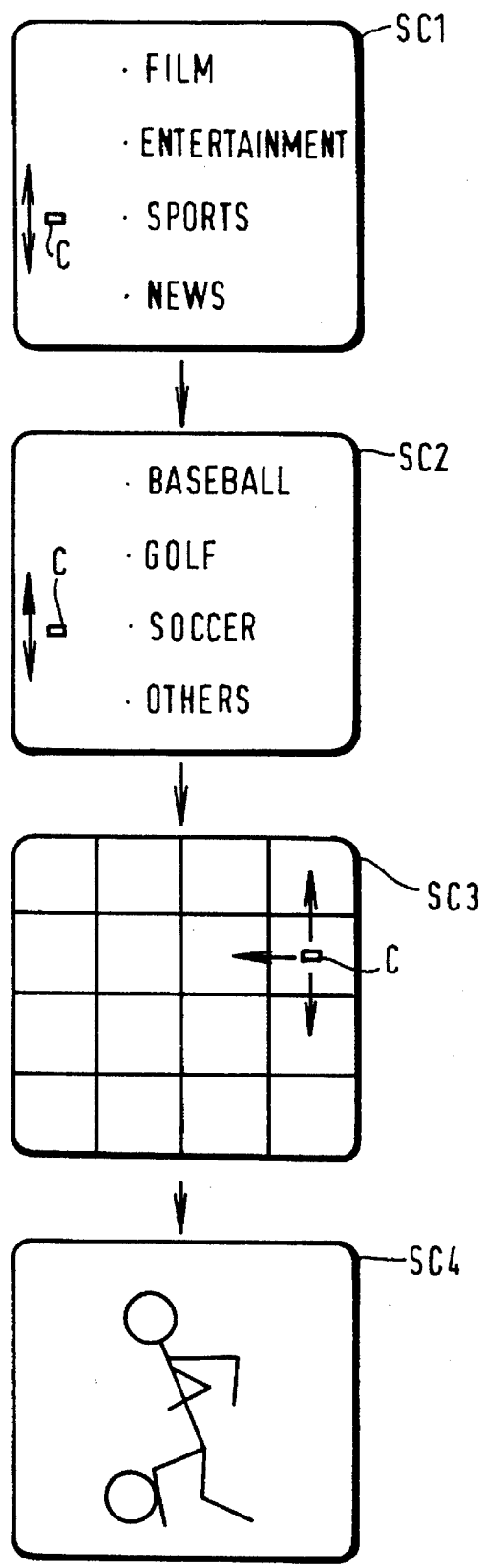
FIG. 10 is a diagram showing a series of program selection images in another embodiment of the present invention.

FIG. 10 is a diagram showing a series of program selection images in another embodiment of the present invention. This embodiment is applied to the two-way CATV broadcasting system which is capable of transmitting an information or instruction from a reception terminal to a broadcasting center. In this case, when a guide channel for selecting a desired program is selected by a program viewer, the broadcasting center transmits an image signal for displaying program guide screen SC1 first as shown in FIG. 10. This program guide screen SC1 shows several different categories of program in which all programs are classified by the broadcasting center and includes cursor image C which is superimposed by the reception terminal. In this state, the program viewer can operate some keys like the unit of operation keys of FIG. 6A so that cursor image C designates a desired category on program guide screen SC1. When the desired category is decided by operating a decision key, the broadcasting center detects that operation and transmits the next image signal for displaying second guide screen SC2 which shows smaller classified categories. For instance, in the case where the category of sports is selected out of program guide screen SC1, second guide screen SC2 involves the categories of baseball, golf, soccer and so on. In this case, after selecting one of these categories by shifting cursor image C in the same manner as the preceding operation, the broadcasting center synthesizes the images of the programs which are classified into the selected category and transmits the synthesis image signal. Thus, the reception terminal displays multi-screen SC3 by demodulating that synthesis image signal and also superimposes cursor image C for the selecting operation by the program viewer. After this process, by the same operation as the above embodiment, the desired program is displayed on the whole screen SC4 of a television set.

As described above, the present invention provides a television signal transmission and reception system by which program viewers can easily look for and select a desired program. In order to provide an improved television signal transmission and reception system, the present invention also provides a television signal transmission system which can transmit a lot of useful information for selecting a desired program, and a television signal reception system which has various functions for making a tuning operation easy and suitable in practical use.

While the present invention has been illustrated and described in detail in the drawings and foregoing description, it will be recognized that changes and modifications can and will occur to those skilled in the art. It is therefore intended by the appending claims, to cover any such modifications as fall within the true spirit and scope of the invention.

I claim:

1. System for transmitting television signals corresponding to a plurality of channels from a program supplier to a program receiver, said system comprising:

first transmission means in said program supplier for modulating said television signals and transmitting modulated television signals to said program receiver;

second transmission means in said program supplier for synthesizing said television signals to produce at least one synthesis television signal for a multi-screen display, for modulating said at least one synthesis television signal and transmitting a modulated synthesis television signal to said program receiver, said multi-screen display comprising a plurality of sub-screens corresponding to said plurality of channels;

reception means in said program receiver for receiving both said modulated television signals and said modulated synthesis television signal and selectively demodulating one of the received signals;

third transmission means in said program supplier for generating and modulating control information which indicates a correspondence between each of said sub-screens and said plurality of channels and for transmitting the modulated control information to said program receiver; and selecting means in said program receiver for receiving and demodulating said modulated control information, and for selecting one of said channels corresponding to said sub-screens in said multi-screen display based on said control information when said modulated synthesis television signal is demodulated by said reception means, wherein said selecting means includes, cursor display means for superimposing a cursor image selectively on one of said sub-screens when said modulated synthesis television signal is demodulated by said reception means;

input means for generating an operation signal in response to an external operation comprising one of a shifting operation and a deciding operation; and control means for receiving said operation signal from said input means and causing said cursor display means to superimpose said cursor image on another sub-screen when said operation signal corresponds to said shifting operation, and said control means detecting a selected channel corresponding to the sub-screen on which said cursor image is superimposed when receiving said operation signal corresponding to said deciding operation based on said control information, and causing said reception means to demodulate said received signal of said selected channel.

2. System as claimed in claim 1, wherein said control means causes said reception means to demodulate an audio signal associated with said received signal of the channel corresponding to the sub-screen on which said cursor image is superimposed.

3. System for transmitting television signals corresponding to a plurality of channels from a program supplier to a program receiver, said system comprising:

first transmission means in said program supplier for modulating said television signals and transmitting modulated television signals to said program receiver;

second transmission means in said program supplier for synthesizing said television signals to produce at least one synthesis television signal for a multi-screen display, for modulating said at least one synthesis television signal and transmitting a modulated synthesis television signal to said program receiver, said multi-screen display comprising a plurality of sub-screens corresponding to said plurality of channels;

reception means in said program receiver for receiving both said modulated television signals and said modulated synthesis television signal and selectively demodulating one of the received signals;

third transmission means in said program supplier for generating and modulating control information which indicates a correspondence between each of said sub-screens in said multi-screen display and said plurality of channels and for transmitting the modulated control information to said program receiver;

fourth transmission means in said program supplier for generating and modulating a notification signal which is provided for displaying a notification program for at least one of said channels, and transmitting the modulated notification signal as one of said modulated television signals to said program receiver, wherein said control information further indicates a correspondence between said notification signal and said channel;

selecting means in said program receiver for receiving and demodulating said modulated control information, and for selecting one of said channels corresponding to said sub-screens in said multi-screen display based on said control information when said modulated synthesis television signal is demodulated by said reception means; and determining means in said program receiver for detecting a correspondence between said notification signal and the channel selected by said selecting means, and for determining whether one of said modulated television signals corresponding to said channel selected by said selecting means and said modulated notification signal is demodulated by said reception means in order to be displayed.

4. Broadcasting system for providing programs corresponding to a plurality of channels as television signals for a transmission network, said broadcasting system comprising:

first modulating means for modulating image and audio signals of said programs corresponding to individual channels of said plurality of channels into television signals;

synthesizing means for synthesizing a plurality of said image signals and producing at least one synthesis image signal by which a multi-screen display having a plurality of sub-screens in one screen is provided;

second modulating means for modulating said at least one synthesis image signal into a television signal;

control information generating means for generating control information which indicates a correspondence between each of said sub-screens and said plurality of channels;

third modulating means for modulating said control information;

transmitting means for receiving output signals of said first, second, and third modulating means, mixing said output signals and supplying a mixed signal to said transmission network;

notification signal generating means for generating a notification signal which is provided for displaying a notification program on at least one of said channels; and fourth modulating means for modulating said notification signal into a television signal, wherein said control information further comprises a correspondence between said notification signal and said plurality of channels, and wherein said transmitting means mixes an output signal of said fourth modulating means with said mixed signal.

5. Apparatus for receiving a plurality of television signals which are transmitted from a broadcasting center with control information and which include a majority of standard television signals corresponding to individual channels and at least one synthesis television signal corresponding to a guide channel by which a multi-screen display having a plurality of sub-screens in one screen is provided, each of said sub-screens being allocated to one of said individual channels, said apparatus comprising:

tuning means for receiving said television signals transmitted from said broadcasting center, and for tuning and demodulating one of said television signals;

control information demodulating means for receiving and demodulating said control information transmitted from said broadcasting center;

input means for generating an operation signal according to an external operation;

control means for receiving said operation signal from said input means and said control information from said control information demodulating means, causing said tuning means to tune in said guide channel and to demodulate said at least one synthesis television signal when said operation signal indicates a selection of said guide channel, for detecting a tuning frequency of a selected channel in accordance with said control information when said operation signal indicates a selection of said selected channel out of said individual channels corresponding to said sub-screens in said multi-screen display and for causing said tuning means to tune in said selected channel and to demodulate said standard television signal of said selected channel;

output means for outputting a demodulated television signal supplied from said tuning means; and cursor display means for superimposing a cursor image selectively on one of said sub-screens when said at least one synthesis television signal is demodulated by said tuning means, wherein said control means causes said cursor display means to shift said cursor image onto another sub-screen according to said operation signal and detects said tuning frequency of a selected channel corresponding to the sub-screen on which said cursor image is superimposed when receiving said operation signal indicating a decision of said selected channel.

6. Apparatus as claimed in claim 5, wherein said control means causes said tuning means to tune in and demodulate an audio signal of the channel corresponding to the sub-screen on which said cursor image is superimposed.

7. Method for transmitting television signals corresponding to a plurality of channels from a program supplier to a program receiver, said method comprising the steps of:

modulating said television signals into transmittable television signals in said program supplier;

synthesizing said television signals to produce a synthesis television signal for a multi-screen display comprising a plurality of sub-screens corresponding to said channels in said program supplier;

modulating said synthesis television signal into a transmittable synthesis television signal in said program supplier;

generating a mixed television signal by mixing said transmittable television signals and said transmittable synthesis television signal in said program supplier;

transmitting said mixed television signal to said program receiver;

receiving said mixed television signal in said program receiver;

selectively demodulating one of said transmittable television signals and said transmittable synthesis television signal in said program receiver;

generating control information for indicating a correspondence between each of said sub-screens and said channels in said program supplier;

modulating said control information into transmittable control information in said program supplier;

adding said transmittable control information to said mixed television signal in said program supplier;

demodulating said transmittable control information in said program supplier; and selecting one of said channels corresponding to said sub-screens based on said control information when said transmittable synthesis television signal is demodulated in said program supplier, wherein said selecting includes the steps of:

superimposing a cursor image selectively on one of said sub-screens when said transmittable synthesis television signal is demodulated;

generating an operation signal according to an external operation corresponding to one of a shifting operation and a deciding operation;

shifting said cursor image onto another sub-screen when receiving said operation signal corresponding to said shifting operation;

detecting a decision channel corresponding to the sub-screen on which said cursor image is superimposed based on said control information when receiving said operation signal corresponding to said deciding operation; and demodulating said transmittable television signal of said decision channel.

8. Method as claimed in claim 7, further comprising the step of:

demodulating an audio signal associated with said transmittable television signal of the channel corresponding to the sub-screen on which said cursor image is superimposed.

9. Method for transmitting television signals corresponding to a plurality of channels from a program supplier to a program receiver, said method comprising the steps of:

modulating said television signals into transmittable television signals in said program supplier;

synthesizing said television signals to produce a synthesis television signal for a multi-screen display comprising a plurality of sub-screens corresponding to said channels in said program supplier;

modulating said synthesis television signal into a transmittable synthesis television signal in said program supplier;

generating a mixed television signal by mixing said transmittable television signals and said transmittable synthesis television signal in said program supplier;

transmitting said mixed television signal to said program receiver;

receiving said mixed television signal in said program receiver;

selectively demodulating one of said transmittable television signals and said transmittable synthesis television signal in said program receiver;

generating control information for indicating a correspondence between each of said sub-screens and said channels in said program supplier;

modulating said control information into transmittable control information in said program supplier;

adding said transmittable control information to said mixed television signal in said program supplier;

demodulating said transmittable control information in said program supplier;

selecting one of said channels corresponding to said sub-screens based on said control information when said transmittable synthesis television signal is demodulated in said program supplier;

generating a notification signal which is provided for displaying a notification program to at least one of said channels in said program supplier;

modulating said notification signal into a transmittable notification signal in said program supplier;

adding said transmittable notification signal to said mixed television signal in said program supplier;

detecting a correspondence between said notification and the channel selected in said program receiver, wherein said control information further comprises a correspondence between said notification signal and said channel; and determining whether one of said transmittable television signals corresponding to said channel selected and said transmittable notification signal is demodulated.

* * * * *